United States Patent
Neft

(10) Patent No.: US 9,298,503 B2
(45) Date of Patent: *Mar. 29, 2016

(54) MIGRATING PROCESSES OPERATING ON ONE PLATFORM TO ANOTHER PLATFORM IN A MULTI-PLATFORM SYSTEM

(71) Applicant: Accenture Global Services Limited, Dublin (IE)

(72) Inventor: Mark Neft, Caldwell, NJ (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/338,850

(22) Filed: Jul. 23, 2014

(65) Prior Publication Data

US 2014/0337851 A1   Nov. 13, 2014

Related U.S. Application Data

(63) Continuation of application No. 12/651,876, filed on Jan. 4, 2010, now Pat. No. 8,832,699.

(60) Provisional application No. 61/177,149, filed on May 11, 2009.

(51) Int. Cl.
*G06F 9/46* (2006.01)
*G06F 9/48* (2006.01)
*G06F 9/50* (2006.01)
*G06F 9/455* (2006.01)
*G06F 11/20* (2006.01)

(52) U.S. Cl.
CPC ............ *G06F 9/4856* (2013.01); *G06F 9/4862* (2013.01); *G06F 9/5088* (2013.01); *G06F 11/203* (2013.01); *G06F 2009/4557* (2013.01)

(58) Field of Classification Search
CPC ................ G06F 9/4856; G06F 11/203; G06F 2009/4557; G06F 9/4862; G06F 9/5088
See application file for complete search history.

(56) References Cited

U.S. PATENT DOCUMENTS

| 5,506,987 | A | 4/1996 | Abramson et al. |
| 5,960,200 | A | 9/1999 | Eager |
| 6,154,877 | A | 11/2000 | Ramkumar |

(Continued)

OTHER PUBLICATIONS

Office Action in Canadian Application No. 2,703,373, dated Aug. 28, 2014, 2 pages.

(Continued)

*Primary Examiner* — Jaweed A Abbaszadeh
*Assistant Examiner* — Xuxing Chen
(74) *Attorney, Agent, or Firm* — Fish & Richardson P.C.

(57) ABSTRACT

Embodiments of the claimed subject matter are directed to methods and a system that allows the optimization of processes operating on a multi-platform system (such as a mainframe) by migrating certain processes operating on one platform to another platform in the system. In one embodiment, optimization is performed by evaluating the processes executing in a partition operating under a proprietary operating system, determining a collection of processes from the processes to be migrated, calculating a cost of migration for migrating the collection of processes, prioritizing the collection of processes in an order of migration and incrementally migrating the processes according to the order of migration to another partition in the mainframe executing a lower cost (e.g., open-source) operating system.

48 Claims, 7 Drawing Sheets

(56) References Cited

U.S. PATENT DOCUMENTS

| | | | |
|---|---|---|---|
| 6,161,219 | A | 12/2000 | Ramkumar |
| 6,615,166 | B1 | 9/2003 | Guheen |
| 6,654,954 | B1 | 11/2003 | Hicks |
| 6,968,370 | B2 | 11/2005 | Wu |
| 7,150,012 | B2 | 12/2006 | Hill |
| 7,634,762 | B1 | 12/2009 | Wheeler |
| 7,720,970 | B2 | 5/2010 | Dube |
| 7,730,468 | B1 | 6/2010 | Trowbridge |
| 7,757,214 | B1 | 7/2010 | Palczak |
| 7,818,410 | B1 | 10/2010 | Barnes |
| 7,853,742 | B2 | 12/2010 | Rothman et al. |
| 8,095,929 | B1 | 1/2012 | Ji |
| 8,266,582 | B2 | 9/2012 | Prakash |
| 8,458,676 | B2 | 6/2013 | Asai et al. |
| 8,832,699 | B2 | 9/2014 | Neft |
| 9,027,005 | B2 | 5/2015 | Neft |
| 2002/0161748 | A1 | 10/2002 | Hamel et al. |
| 2003/0187915 | A1 | 10/2003 | Sun |
| 2004/0194055 | A1 | 9/2004 | Galloway |
| 2005/0091649 | A1 | 4/2005 | Qureshi |
| 2005/0268298 | A1* | 12/2005 | Hunt et al. .................. 718/1 |
| 2006/0031813 | A1 | 2/2006 | Bishop |
| 2006/0112247 | A1* | 5/2006 | Ramany et al. ............ 711/165 |
| 2006/0123111 | A1 | 6/2006 | Dea |
| 2006/0136695 | A1 | 6/2006 | Vaupel |
| 2006/0136910 | A1 | 6/2006 | Brickell |
| 2006/0136911 | A1 | 6/2006 | Robinson |
| 2006/0136912 | A1 | 6/2006 | Robinson |
| 2006/0150148 | A1 | 7/2006 | Beckett |
| 2007/0240143 | A1 | 10/2007 | Guminy |
| 2008/0184195 | A1 | 7/2008 | Lee |
| 2008/0235388 | A1 | 9/2008 | Fried et al. |
| 2008/0270515 | A1 | 10/2008 | Chen |
| 2008/0313257 | A1 | 12/2008 | Allen |
| 2009/0313004 | A1 | 12/2009 | Levi |
| 2009/0328033 | A1 | 12/2009 | Kohavi |
| 2010/0162252 | A1* | 6/2010 | Bacher ..................... 718/102 |
| 2010/0191854 | A1 | 7/2010 | Isci |
| 2010/0287542 | A1 | 11/2010 | Neft |
| 2010/0287549 | A1 | 11/2010 | Neft |
| 2010/0287560 | A1 | 11/2010 | Neft |
| 2011/0289491 | A1 | 11/2011 | Hsiao |
| 2013/0036409 | A1 | 2/2013 | Auerbach et al. |
| 2015/0007186 | A1 | 1/2015 | Neft |
| 2015/0220334 | A1 | 8/2015 | Neft |

OTHER PUBLICATIONS

Office Action in Chinese Application No. 201010177487.2, dated Mar. 30, 2014, 3 pages (English Translation).
Perrone et al., "zSeries and z/OS HiperSockets Overview," Jan. 2003, IBM System Magazine, 5 pages.
HP and Intel, "Single Source for Multiple Platforms," 2 pages, copyright Apr. 2010.
IBM, "z/OS Basic Skills Information Center—Mainframe Concepts" 58 pages, copyright IBM Corp. 2005, 2008.
Oracle, "Oracle® Identity Manager—Connector Guide for IBM RACF Advanced," Release 9.0.2, 54 pages, Sep. 2006.
White et al., "HiperSockets Implementation Guide," 132 pages, Mar. 2007.
Wikipedia, "Just-in-time Compilation," from Oct. 14, 2007, 3 pages.
U.S. Non-Final Office Action for U.S. Appl. No. 12/651,876 dated Apr. 10, 2012, 11 pages.
U.S. Final Office Action for U.S. Appl. No. 12/651,876 dated Sep. 14, 2012, 8 pages.
U.S. Non-Final Office Action for U.S. Appl. No. 12/651,876 dated Sep. 26, 2013, 9 pages.
U.S. Appl. No. 12/651,876, filed Jan. 4, 2010, Mark Neft, U.S. Pat. No. 8,832,699.
U.S. Appl. No. 12/652,930, filed Jan. 6, 2010, Mark Neft, U.S. Pat. No. 8,856,795.
U.S. Appl. No. 14/488,398, filed Sep. 17, 2014, Mark Neft, 2015-0007186.
U.S. Appl. No. 12/652,667, filed Jan. 5, 2010, Mark Neft, U.S. Pat. No. 8,813,048.
U.S. Appl. No. 14/297,694, filed Jun. 6, 2014, Mark Neft, U.S. Pat. No. 9,027,005.
U.S. Appl. No. 14/686,328, filed Apr. 14, 2015, Mark Neft, 2015-0220334.
Office Action in Chinese Application No. 201010177487.2, dated Feb. 25, 2015, 6 pages (with English Translation).
Office Action in Chinese Application No. 201010177487.2, dated Nov. 4, 2014, 7 pages (with English Translation).
Office Action in Chinese Application No. 201010177487.2, dated Apr. 30, 2014, 7 pages (English Translation).
Office Action in Chinse Application No. 201010177487.2, dated Nov. 20, 2013, 11 pages (with English translation).
U. S. Notice of Allowance for U.S. Appl. No. 12/651,876, dated Jul. 1, 2014, 5 pages.
U.S. Final Office Action for U.S. Appl. No. 12/652,930 dated Sep. 20, 2013, 8 pages.
U.S. Non-Final Office Action for U.S. Appl. No. 12/652,667 dated Sep. 19, 2013, 33 pages.
U.S. Non-Final Office Action for U.S. Appl. No. 12/652,930 dated Aug. 13, 2012, 14 pages.
U.S. Non-Final Office Action for U.S. Appl. No. 12/652,930 dated Mar. 8, 2013, 10 pages.
U.S. Non-Final Office Action for U.S. Appl. No. 12/652,930 dated Feb. 25, 2014, 9 pages.
U.S. Non-Final Office Action for U.S. Appl. No. 14/297,694 dated Nov. 10, 2014, 14 pages.
U.S. Non-Final Office Action for U.S. Appl. No. 14/488,398, dated Jun. 30, 2015, 15 pages.
U.S. Notice of Allowance for U.S. Appl. No. 12/652,667 dated Feb. 27, 2014, 8 pages.
U.S. Notice of Allowance for U.S. Appl. No. 12/652,667 dated Jun. 2, 2014, 8 pages.
U.S. Notice of Allowance for U.S. Appl. No. 12/652,930 dated Aug. 4, 2014, 7 pages.
U.S. Notice of Allowance for U.S. Appl. No. 14/297,694 dated Jan. 26, 2015, 12 pages.
Yagoubi et al., "Load Balancing Strategy in Grid Environment," J Information Technol App., 1(4):285-296 (Mar. 1, 2007).
Office Action in EP Application No. 10250902.3, dated Dec. 14, 2015, 7 pages.

\* cited by examiner

MIGRATING PROCESSES OPERATING ON ONE PLATFORM TO ANOTHER PLATFORM IN A MULTI-PLATFORM SYSTEM

CLAIM OF PRIORITY

This application is a continuation (and claims the benefit of priority under 35 USC 120) of U.S. application Ser. No. 12/651,876, filed Jan. 4, 2010, now allowed, which claims priority to provisional patent application entitled "Optimizing A Distribution of Applications Operating In A Multiple Environment System," U.S. Application Ser. No. 61/177,149 filed on May 11, 2009. Both of these prior applications are incorporated by reference in their entirety.

BACKGROUND

Mainframes are computing systems used mainly by large businesses and organizations for executing mission and task-critical applications (such as bulk data processing) that are often essential to the core of the business or organization. These applications often provide a competitive advantage to the organization, and thus mainframes are designed for the purposes of longevity, fault tolerance, and durability.

In addition, mainframes also offer vastly increased computing performance relative to ordinary person computers. Compared to a personal computer such as a PC, mainframes will commonly have hundreds to thousands of times as much data storage, and the capability to access, manipulate, and perform operations on such data much faster. Mainframes are designed to handle very high volumes of input and output (I/O) and emphasize throughput computing. Traditionally, mainframe designs have included several subsidiary computers (called channels or peripheral processors) which manage the I/O devices, leaving the central processing unit (CPU) free to deal only with high-speed memory. In addition, typical mainframe applications are often used to perform tasks which are essential to the core of the business operating the mainframe.

In addition, nearly all conventional mainframes also have the ability to run (or host) multiple operating systems, and thereby operate not as a single computer but as a number of virtual machines. This is most commonly achieved through the use of multiple logical partitions. Each logical partition, commonly referred to as a "LPAR," is a subset of a computing system's hardware resources that is virtualized as a separate computer. In this role, a single mainframe can replace dozens or even hundreds of smaller servers. As a general practice, mainframes often utilize the proprietary operating system of the mainframe's manufacturer, and conventional implementations may comprise a single mainframe operating numerous instances of the same operating system. Recent developments have enabled the combination of various, disparate operating systems operating in distributed logical partitions in the same mainframe.

Unfortunately, mainframes are typically very expensive to purchase and procure. Moreover, mainframe operating systems and applications can also be very expensive to develop and/or license. Due to the relatively small number of mainframe manufacturers and software developers, mainframe consumers typically have few options beyond a mainframe manufacturer's proprietary operating system. Naturally, reliance on a single, proprietary operating system can be expensive and licensing fees for the proprietary operating system can contribute significantly to the cost of owning and operating a mainframe, as well as purchasing mainframe computing services. Moreover, these fees are almost certain to continue to grow for a mainframe consumer due to maintenance and upgrade fees. An alternative to actual ownership of mainframes is to rent mainframe computing services from a mainframe service provider. However, a service purchasing arrangement with these providers (which can be the mainframe manufacturers themselves) can often be just as expensive over time.

Unfortunately, limiting the cost of mainframe ownership and operation is difficult to achieve. Conventional approaches in response to this problem include: continuing operation under a status quo paradigm; transferring operation of the processes in the system to alternate platforms; purchasing additional software and hardware packages; and tactically managing the additional costs. However, these approaches each suffer from significant flaws. The approach of operating under a status quo paradigm will be unlikely to limit the increasing cost of mainframe ownership and operation, as dependency on commercial mainframe manufacturers and software developers persists.

Transferring operation of the processes in the system to alternate platforms consists of taking processes operating in the current platform and moving the operation of the application to an alternate platform. For example, the business or organization's proprietary applications that provide the competitive advantage may be moved to other platforms (such as servers). However, transferring operation of the processes in a system to alternate platforms can be risky and may result in additional delays, inconsistent results and unpredictable behavior. Moreover, alternate platforms may result in waste, may be similarly costly, and may require significant additional capital expenditure. In addition, use of these alternative platforms can preclude the ability to offload certain processes to other resident, specialized processors capable of faster and/or concurrent processing Purchasing additional third party software is another approach to limiting the cost (e.g., eliminating the cost of developing proprietary software). However, this approach also eliminates the competitive advantages of proprietary applications. Moreover, this approach requires additional licensing fees and may not substantially reduce the cost of operation and/or ownership.

Tactical management of additional costs typically involves proactively controlling cost increases due to increases in volume, or limiting licensing fees to current implementations. However, this can severely affect an operation's efficacy if the operation grows, as performance may suffer from obsolete or insufficient resources and applications. Moreover, tactical management is not typically a successful long term solution as costs are not truly reduced, but rather, redistributed (e.g., as a loss in performance).

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the claimed subject matter are directed to methods and a system that allows the optimization of processes operating on a multi-platform system (such as a mainframe) by migrating certain processes operating on one platform to another platform in the system. In one embodiment, optimization is performed by evaluating the processes executing in a partition operating under a proprietary operating system, determining a collection of processes from the processes to be migrated, calculating a cost of migration for migrating the collection of processes, prioritizing the collection of processes in an order of migration and incrementally migrating the processes according to the order of migration to another partition in the mainframe executing an open-source operating system.

In another embodiment, migration of a process executing in a partition operating under a proprietary operating system is performed by identifying processes amenable to migration, duplicating the process in a separate logical partition operating under a low-cost operating system, and testing the execution of the process in the low-cost operating system.

In yet another embodiment, a system is provided for optimally migrating processes operating on one platform in a multi-platform system. According to some embodiments, the system includes a mainframe with at least two logical partitions, with at least one platform executing on each of the partitions. Processes executing on one platform is migrated to the other platform to achieve an optimal distribution based on an evaluation of the cost of migration.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
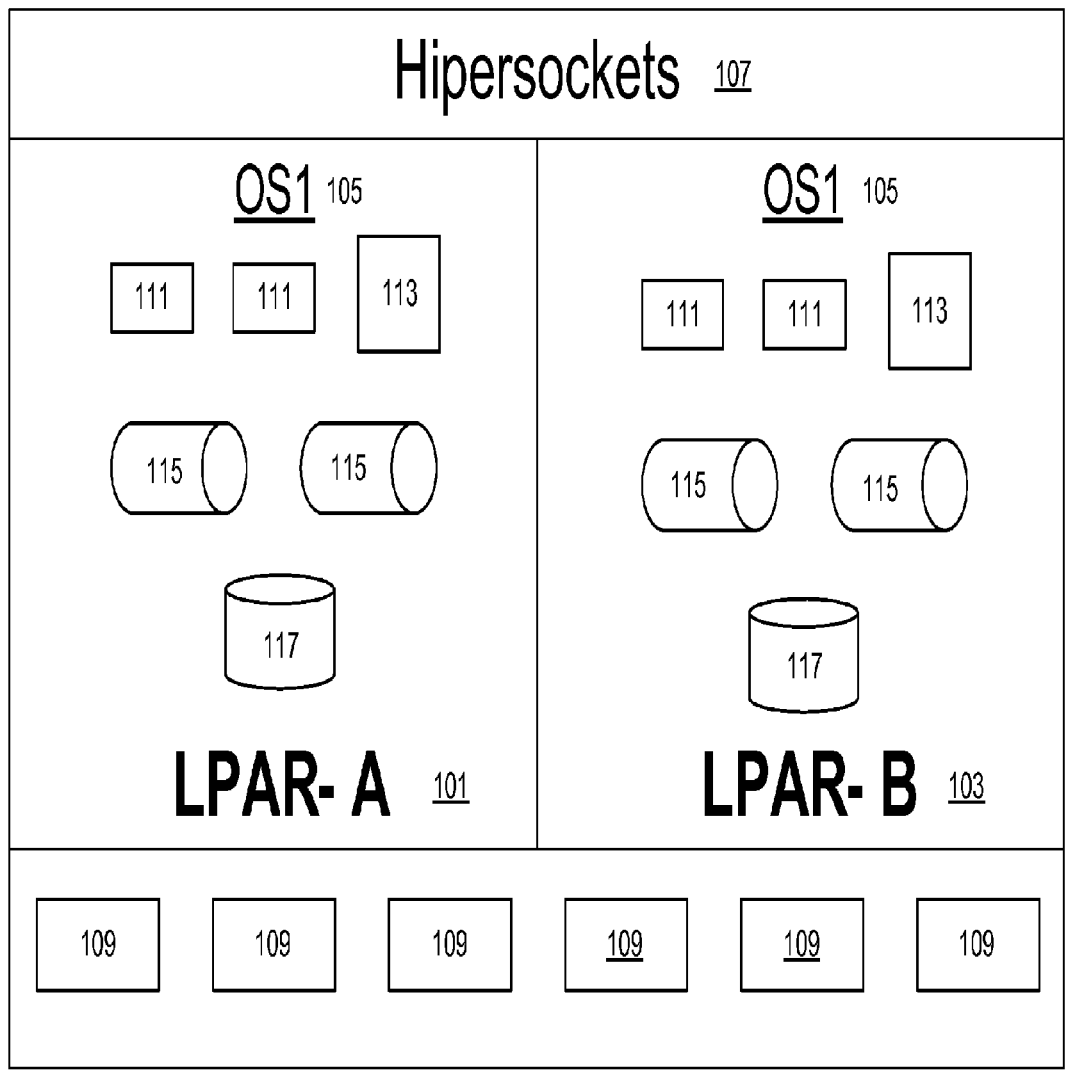
FIG. 1 depicts an exemplary conventional distribution of applications in a multi-partition mainframe, in accordance with various embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein (e.g., FIGS. 6, 7) describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Application Distribution in a Mainframe

According to embodiments of the present invention, a system for optimally distributing processes between platforms in a multi-platform system is provided. In one embodiment, a system comprising a plurality of logical partitions, each partition hosting at least one platform and each platform executing one or more processes is provided. FIG. 1 depicts an exemplary conventional distribution of applications in a multi-partition system 100, in accordance with embodiments of the present invention.

In one embodiment, system 100 may be implemented as, for example, a mainframe computing system. As depicted, system 100 is implemented as a mainframe computing system comprising a plurality of logical partitions (e.g., LPAR-A 101 and LPAR-B 103). As presented, each logical partition hosts at least one platform. In one embodiment, the platform is implemented as an operating system (e.g., OS1 105). In further embodiments, these operating systems may be proprietary operating systems licensed by the mainframe's manufacturer. In a typical configuration, each partition is communicatively coupled via inter-partition communication means such as through a bus or through memory via a protocol (e.g., Hipersockets 107). As depicted in FIG. 1, system 100 includes hipersockets 107 to facilitate communication between the separate partitions 101, 103.

In some embodiments, the system 100 may have a plurality of applications executing in one or more of the system's partitions 101, 103. In a typical embodiment, these applications may include, but are not limited to, transaction servers 111, databases 117 and database management applications 113, network communications software 115. In some embodiments, for partitions 101, 103 hosting the same platform 105, one or more of the applications running in one partition (e.g., partition 101) may also be executed in the same platform 105 hosted on the second partition (e.g., partition 103). In still further embodiments, system 100 may also include specialized processors or engines (e.g., processors 109) for performing particular tasks only.

Alternate Platforms on Additional Logical Partitions

Figure 2:
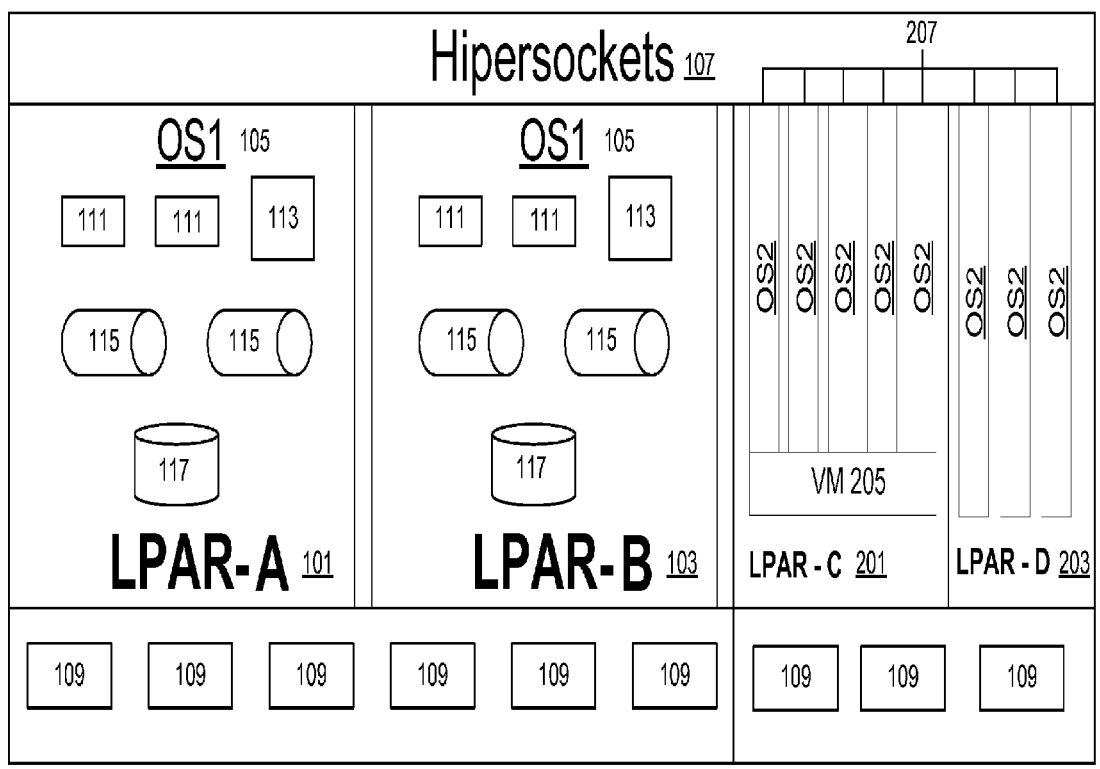
FIG. 2 depicts an exemplary distribution of applications in a multi-partition mainframe executing at least two operating systems, in accordance with various embodiments of the present invention.

In one embodiment, a mainframe or like computing system is configured to execute dissimilar platforms in multiple logical partitions. FIG. 2 depicts an exemplary distribution of applications in a multi-partition system 200 executing at least two operating systems, in accordance with various embodiments of the present invention. As presented, system 200 includes the logical partitions (e.g., LPAR-A 101 and LPAR-B 103) executing the same platform 105; hipersockets 107; applications (111, 113, 115, and 117) and specialized processors 109; described above with reference to system 100 of FIG. 1. In typical configurations, the platforms executing on the logical partitions LPAR-A 101 and LPAR-B 103 may be proprietary operating systems licensed by the mainframe's manufacturer. However, this may lead to significant and/or excessive operating costs.

As shown in FIG. 2, the cost of operating additional platforms may be mitigated through the execution of alternate, lower-cost, and non-proprietary platforms. These platforms (e.g., OS2 207) may be executed on additional logical partitions (e.g., LPAR-C 201, LPAR-D 203) in the system 200. In one embodiment, the platforms may be executed directly as operating systems (e.g., instances of OS2 207 in LPAR-D 203). In alternate embodiments, the platforms may also be instanced as virtual machines (e.g., VM 205 of LPAR-C 201). Therefore, by using lower-cost and/or non-proprietary platforms, a mainframe operator or mainframe service consumer may be able to mitigate much of the operational costs due to software licensing that has traditionally been an unavoidable cost of using a mainframe.

Application Migration Across Disparate Platforms

Figure 3:
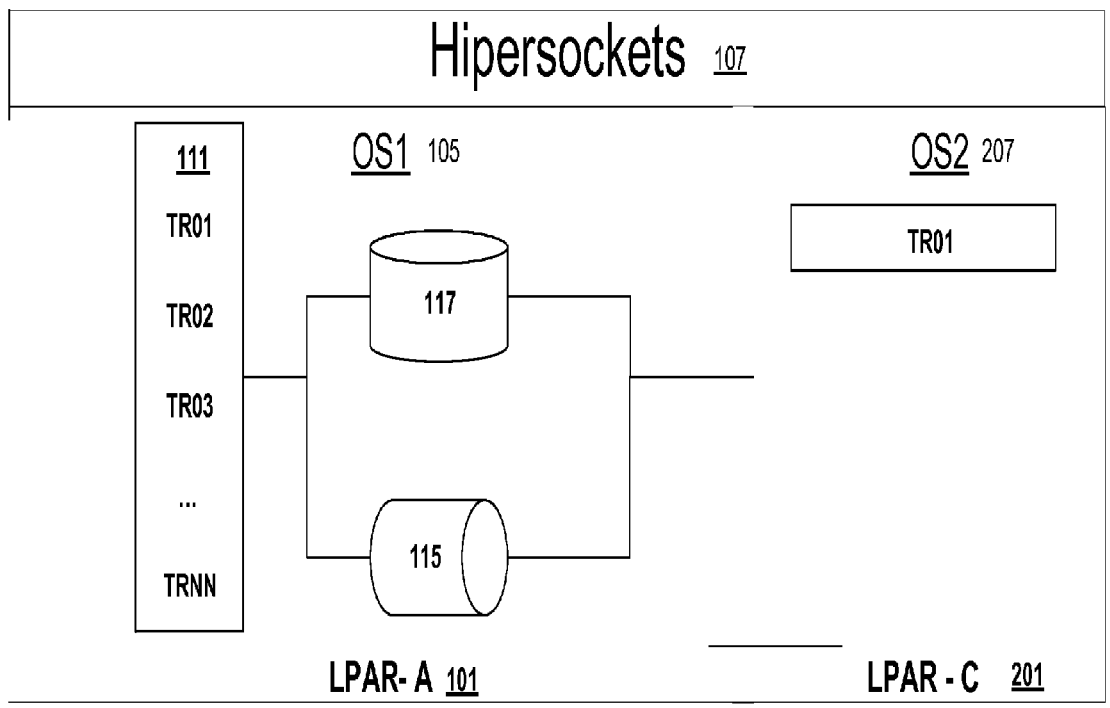
FIG. 3 depicts an exemplary migration of processes in a multi-platform mainframe executing at least two operating systems according to a first pre-defined stage, in accordance with various embodiments of the present invention.

In some embodiments, the cost of operating a mainframe may be further reduced by migrating pre-executing processes in a higher-cost and/or proprietary platform to a lower-cost and/or non-proprietary platform while balancing costs to efficacy, security, reliability and/or performance. However, not every application executing in a platform may be amenable towards migration. Accordingly, optimizing the balance of applications between each platform can result in significant savings while maintaining or exceeding current levels of performance. FIG. 3 depicts an exemplary migration of processes in a multi-platform system executing at least two operating systems according to a first pre-defined stage 300, in accordance with various embodiments of the present invention. In a typical configuration, system 300 includes multiple logical partitions (e.g., LPAR-A 101, LPAR-C 201); a first platform (e.g., OS1 105) executing on a logical partition (e.g., LPAR-A 101); a second platform (e.g., OS2 207) executing on the other logical partition (e.g., LPAR-C 201); and a plurality of applications (111, 117, 115).

As depicted in FIG. 3, an application (e.g., application 111) executing on the first platform may perform, during execution, a plurality of processes and/or transactions. These processes and transactions may incorporate additional applications executing within and/or without the first platform. In one embodiment, an application and/or a specific process or transaction of an application may be migrated from being executed in the first platform to being executed in the second platform. Migration of a process or transaction may be performed by, for example, duplicating the execution of the target transaction or process in the second platform and temporarily executing the process or transaction in both platforms concurrently. Thus, for example, data used by the process or transaction executing in the first platform may be duplicated and used in the process or transaction executing in the second platform. In one embodiment, the process may be duplicated to have the same source code. In still further embodiments, the process may be structured so that the same data runs through both instances of the process. Alternatively, the process may be structured such that specific instructions may be performed in alternating instances, the instructions delegated by a load processor. As discussed above, communication and data may be transferred between platforms via inter-partition communication means (e.g., hipersockets 107).

In some embodiments, certain applications are dependent on the specific application or portions of a specific application and may not be easily migrated. In one embodiment, applications with the least amount of dependencies while recouping the highest amount of savings may be prioritized. To determine the viability of migrating an application between platforms, a heuristic may be used to determine the application's candidacy. In one embodiment, an application's candidacy may be determined by evaluating the application's dependencies and relative coupling to the underlying operating system. In still further embodiments, the application's candidacy may include an estimated savings in computing cost.

In one embodiment, computing savings may be determined for a plurality of processes by generating the CPU consumption of an application or process, and parsing the source code for the application or process to determine the number of operands in the source code. The plurality of processes can subsequently prioritized by comparing the respective numbers of operands and CPU consumptions to determine the estimated savings.

In one embodiment, the dependencies of the specific applications in a platform may be determined by creating logic flows corresponding to each of the specific applications. The logic flows may be utilized to identify a demarcation of a process to migrate the process on to the other platform without increasing the latency and/or complexity of the operations.

In further embodiments, the target transaction or process may be monitored in the second platform to ensure the maintenance of certain standards or metrics (e.g., reliability, performance). In still further embodiments, a primary operation of the process or transaction may be transferred from the first platform to the second platform to increase testing or to complete migration, as desired. In one embodiment, one or more processes, transactions, or even applications may be migrated between platforms. According to these embodiments, the processes, transactions and applications executing in a first platform may be evaluated for suitability of migration. For example, certain applications which are intricately linked to the first platform may be unsuitable for migration, and thus may not be selected for migration. In some embodiments, migration of one or more applications may be performed in pre-defined stages, e.g., to minimize risk to the entire system. As depicted in FIG. 3, transaction 1 (e.g., TR01) is migrated between the first platform OS1 105 and the second platform OS2 207. In one embodiment, the first platform (e.g., OS1 105) may be implemented as a proprietary operating system licensed by the mainframe manufacturer. In some embodiments, the second platform (e.g., OS2 207) may be implemented as a lower-cost and/or non proprietary operating system.

Figure 4:
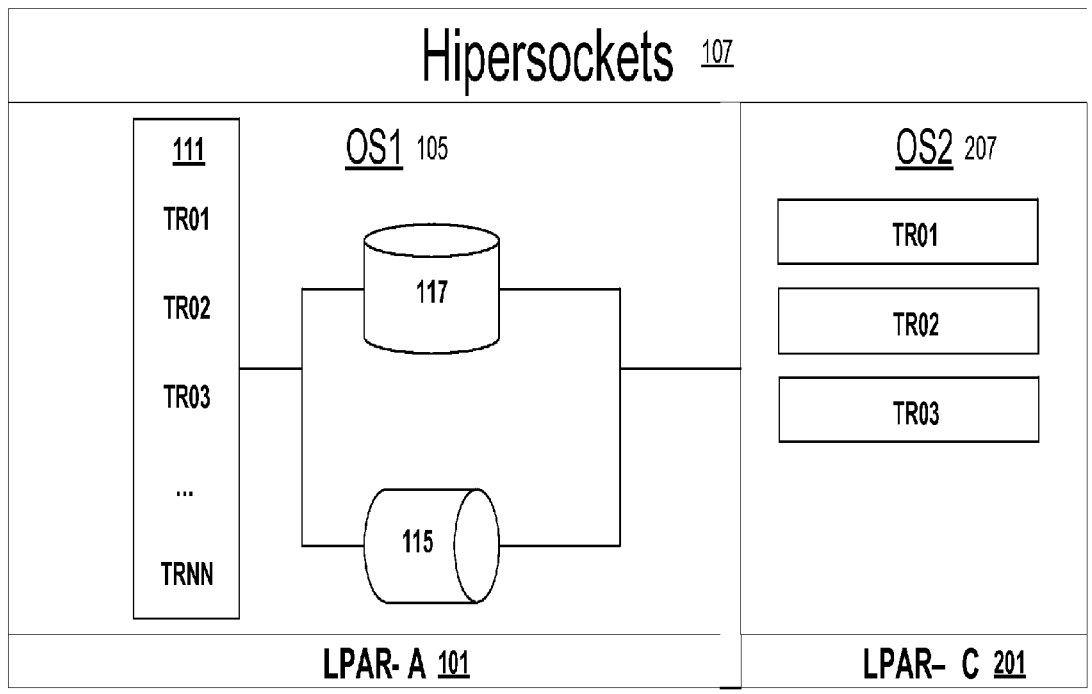
FIG. 4 depicts an exemplary migration of processes in a multi-platform mainframe executing at least two operating systems according to a second pre-defined stage, in accordance with various embodiments of the present invention.

FIG. 4 depicts an exemplary migration of processes in a multi-platform system executing at least two operating systems according to a second pre-defined stage 400, in accordance with various embodiments of the present invention. FIG. 4 includes the components of FIG. 3, but depicts the migration of additional transactions (e.g., TR02, TR03) comprising an application (e.g., application 111) from the first platform OS1 105 to the second platform OS2 207.

Figure 5:
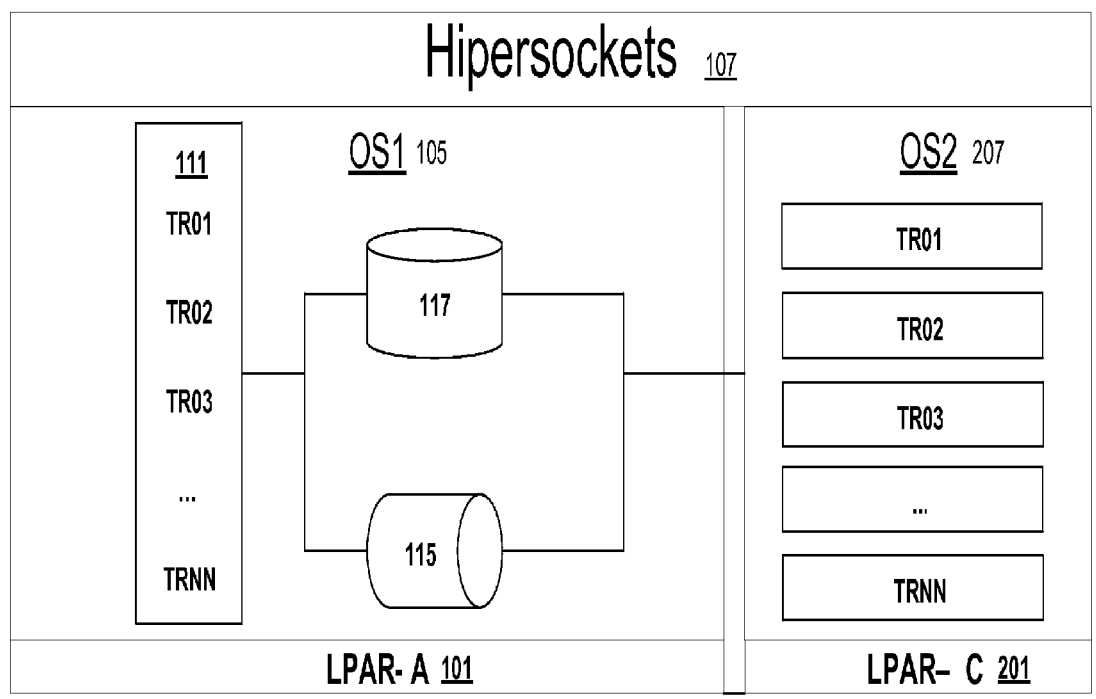
FIG. 5 depicts an exemplary distribution of processes in a multi-platform mainframe executing at least two operating systems after a process migration, in accordance with various embodiments of the present invention.

FIG. 5 depicts an exemplary distribution of processes in a multi-platform mainframe executing at least two operating systems after a process migration 500, in accordance with various embodiments of the present invention. FIG. 5 includes the components of FIGS. 3 and 4, and depicts the finalized migration of all of the transactions (e.g., TR02, TR03, . . . TRNN) comprising the application 111 from the first platform OS1 105 to the second platform OS2 207. Once an application or applications have been successfully migrated from the first platform to one or more other platforms, primary operation of the application may be transferred, and execution of the application in the first platform may be terminated. Thus, in some embodiments, only the transactions or processes intricately linked or specific to the first platform (e.g., assemblers) will remain executing on the first platform after migration is completed.

Evaluating Applications for Migration

Figure 6:
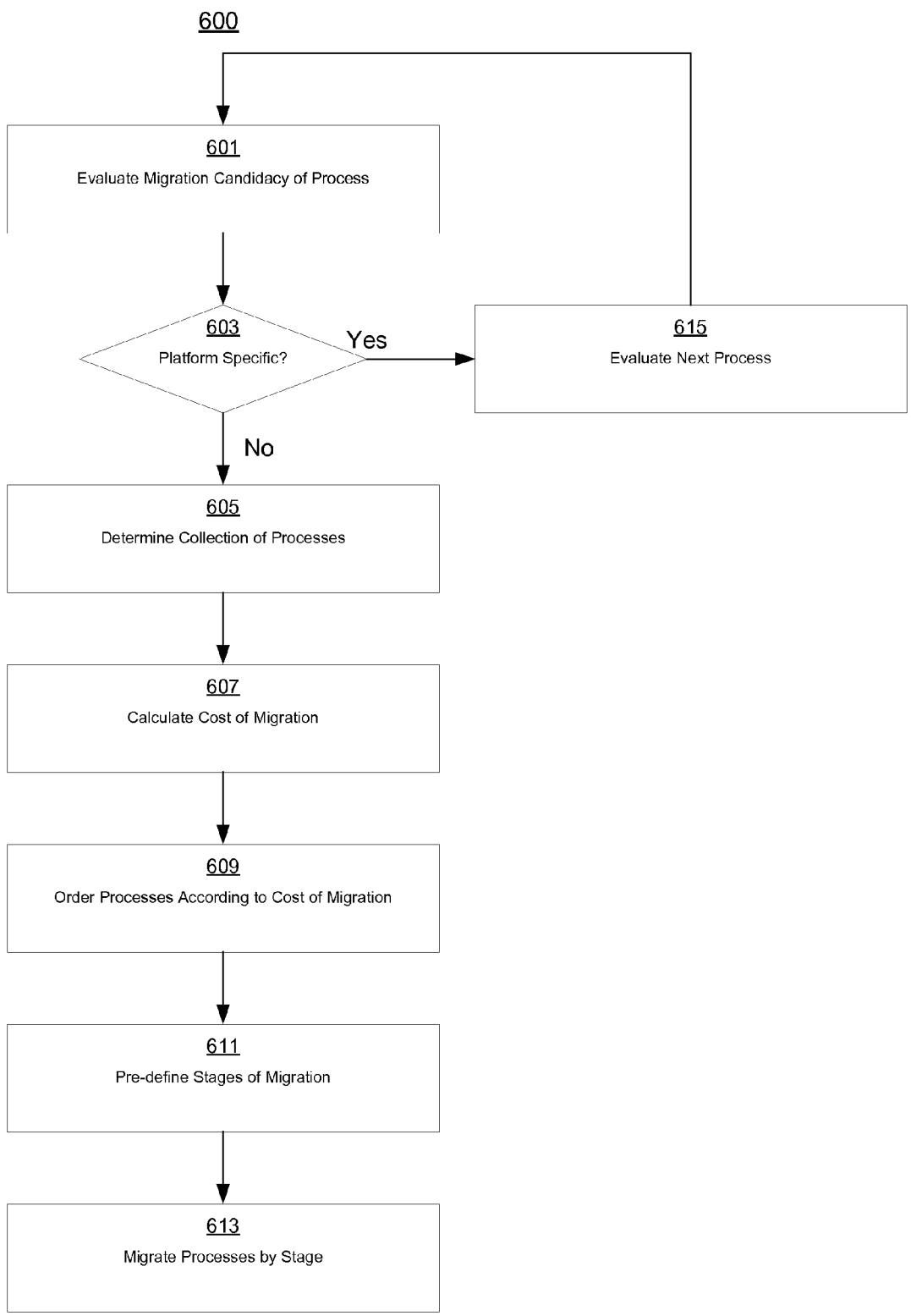
FIG. 6 depicts an exemplary flowchart of a process of optimizing the distribution of applications between platforms in a multi-platform system, in accordance with various embodiments of the present invention.

With reference to FIG. 6, an exemplary flowchart 600 of a process of optimizing the distribution of applications between platforms in a multi-platform system is depicted, in accordance with various embodiments of the present invention. In one embodiment, the multi-platform system includes at least one lower-cost platform (e.g., an open source operating system such as Linux). Steps 601-615 describe exemplary steps of the flowchart 600 in accordance with the various embodiments herein described. In one embodiment, flowchart 600 is provided to identify which part of an application executing in the system that should be migrated to the lower-cost platform without increasing the risk of the organization or increasing network latency.

At step 601, an evaluation of a process or transaction performed by an application executing in a higher-cost platform for suitability of migration is initiated. Evaluation of a process or transaction may include, for example, selecting a process executing in a higher-cost platform for evaluation. In one embodiment, an application's candidacy may be determined by evaluating the application's dependencies and relative coupling to the underlying operating system. In still further embodiments, the application's candidacy may include an estimated savings in computing cost.

At step 603, whether the process is platform specific is determined. Platform-specificity may include, for example, a high level of dependency on platform resources, rather than total platform specificity. If the process is determined at step 603 to be platform dependent, the process or transaction is not considered a candidate for migration and the process proceeds to step 615, where another process or transaction is selected for evaluation. However, if the process is determined at step 603 to not be platform specific, the process proceeds to step 605.

At step 605, a plurality of migration candidates is collected. The migration candidates are collected by aggregating the processes which have been evaluated at step 601 as candidates for migration and also determined at step 603 to not be excessively coupled to the underlying platform or operating system.

At step 607, a cost of migration for each migration candidate in the collection of processes is calculated. The cost of migration may be calculated by, for example, considering the computing savings for the collection of processes by generating the CPU consumption of the particular transaction, application, or process, and parsing the source code for the application or process to determine the number of operands in the source code. The cost plurality of processes can be further calculated by comparing the respective numbers of operands and CPU consumptions to determine the estimated savings. At step 609, each process, transaction or application may be ordered according to the cost of migration.

At step 611, the migration may be organized into a series of sequential stages to reduce the risk to the system. Finally, at step 613, the processes may be migrated in compliance with the stages defined at step 611.

Process Migration

Figure 7:
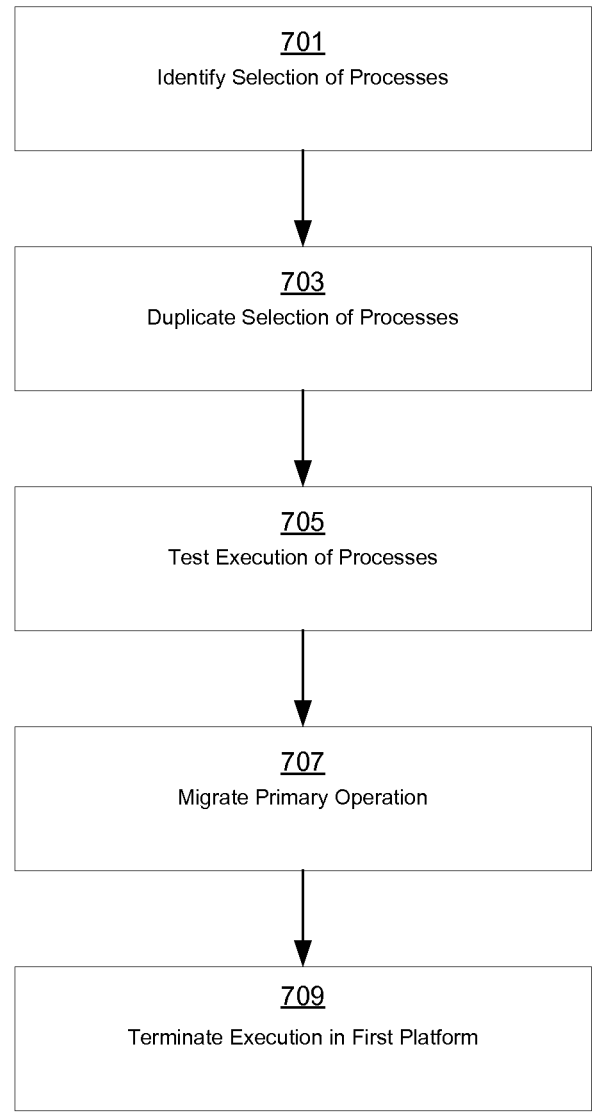
FIG. 7 depicts an exemplary flowchart of a process of migrating processes between a first platform to a second platform in a multi-platform system, in accordance with various embodiments of the present invention.

With reference to FIG. 7, an exemplary flowchart 700 of a process of migrating processes between a first platform to a second platform in a multi-platform system is depicted, in accordance with various embodiments of the present invention. Steps 701-709 describe exemplary steps of the flowchart 700 in accordance with the various embodiments herein described.

At step 701, a selection of processes executing in a first platform is identified for migration to a second platform. In one embodiment, the processes may be identified according to a heuristical evaluation (e.g., steps 601 through 607 of FIG. 6 described above). At step 703, the selection of processes identified in step 701 is duplicated in a second, disparate platform at step 703. Duplication may include, for example, duplicating data used by the process executing in the first platform in the process executing in the second platform. In one embodiment, the process may be duplicated to have the same source code. In still further embodiments, the process may be structured so that the same data runs through both instances of the process. Alternatively, the process may be structured such that specific instructions may be performed in alternating instances, the instructions delegated by a load processor.

At step 705, an execution of the processes in the second platform is tested. Testing may include, for example, monitoring the processes in the second platform, as well as other traditional software testing protocols such as load and fault tolerance. In one embodiment, simulated events may be used to induce specific circumstances. Once testing is completed, primary operation of the process may be transferred to the process executing in the second platform at step 707. Transfer of the primary operation may include, for example, funneling the actual real time data from the first platform to the process. In some embodiments, the process in the first platform may be terminated at step 709.

Accordingly, significant operational costs may be mitigated in mainframe operation through the use of multiple platforms by optimizing the distribution of processes. This distribution of processes may be accomplished by, for example, evaluating the suitability of migration for one or more processes, duplicating the processes and testing the processes in a second, lower-cost platform.

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   evaluating a candidacy of a plurality of processes executing on a first platform of a multi-platform system for migration to a different, second platform of the multi-platform system;
   selecting a process from the plurality of processes to be migrated from the first platform to the second platform;
   duplicating an execution of the process on the second platform while the process continues to execute on the first platform;
   monitoring the execution of the process on the second platform to ensure predetermined standards for the execution of the process; and
   changing a destination of real time data for the process from the first platform to the second platform.

2. The method of claim 1, wherein:
   the multi-platform system comprises a plurality of logical partitions including a first logical partition and a second logical partition; and
   the first platform comprises a first operating system executing in the first logical partition, and the second platform comprises a different, second operating system executing in the second logical partition of the plurality of logical partitions.

3. The method of claim 1, wherein selecting the process to be migrated from the first platform to the second platform comprises:
   selecting a subset of the processes based on the evaluation of the candidacy of the plurality of processes;
   determining a cost of migrating each of the processes of the subset;
   determining a migration priority of each of the processes of the subset using the respective cost of migrating each of the processes of the subset; and
   selecting a highest priority process from the subset as the process to be migrated from the first platform to the second platform using the migration priority.

4. The method of claim 3, wherein selecting the subset of the processes comprises selecting a subset of the processes that are determined to be not specific to the first platform.

5. The method of claim 3, comprising:
   determining (i) an amount of processing required by a central processing unit of the multi-platform system to perform the process, (ii) a number of operands included in source code corresponding to the process, or (iii) a number of dependencies corresponding to the process, wherein the cost for migrating the process is based at least on (i) the amount of processing required by a central processing unit of the multi-platform system to perform the process, (ii) the number of operands included in source code corresponding to the process, or (iii) the number of dependencies corresponding to the process.

6. The method of claim 5, wherein determining a number of dependencies corresponding to the process comprises estimating a number of operations performed with one or more other processes by the process.

7. The method of claim 5, wherein determining a migration priority of each of the processes of the subset comprises assigning (i) a first priority to the process if the cost of migrating the process does not satisfy a threshold, or (ii) a second, lower priority to the process if the cost of migrating the process does satisfy a threshold.

8. The method of claim 1, wherein evaluating the candidacy of the plurality of processes comprises determining whether the process is specific to the first platform.

9. The method of claim 1, wherein monitoring the execution of the process on the second platform to ensure the predetermined standards for the execution of the process comprises monitoring the reliability of the execution of the process on the second platform.

10. The method of claim 1, wherein monitoring the execution of the process on the second platform to ensure the predetermined standards for the execution of the process comprises monitoring the performance of the execution of the process on the second platform.

11. The method of claim 1, wherein duplicating the execution of the process on the second platform while the process continues to execute on the first platform comprises duplicating data used by the process for use by the process executing on the second platform.

12. The method of claim 11, comprising using output from both the process executing on the first platform and from the process executing on the second platform.

13. The method of claim 11, comprising:
    testing the execution of the process on the second platform prior to changing the destination of the real time data for the process from the first platform to the second platform; and
    determining that the execution of the process on the second platform passes the testing and, in response, changing the destination of real time data for the process from the first platform to the second platform.

14. The method of claim 1, wherein selecting the process to be migrated from the first platform to the second platform comprises selecting the process that is part of an application executing on the first platform, the method comprising:
    testing the execution of the process on the second platform prior to changing the destination of the real time data for the process from the first platform to the second platform;
    determining that the execution of the process on the second platform passes the testing and, in response, changing the destination of real time data for the process from the first platform to the second platform; and
    selecting another process from the plurality of processes that is part of the application executing on the first platform to be migrated from the first platform to the second platform.

15. The method of claim 1, wherein selecting the process to be migrated from the first platform to the second platform comprises selecting the process that is part of an application executing on the first platform.

16. The method of claim 1, comprising terminating the execution of the process on the first platform.

17. A system comprising:
    one or more computers and one or more storage devices storing instructions that are operable, when executed by the one or more computers, to cause the one or more computers to perform operations comprising:
       evaluating a candidacy of a plurality of processes executing on a first platform of a multi-platform system for migration to a different, second platform of the multi-platform system;

selecting a process from the plurality of processes to be migrated from the first platform to the second platform;

duplicating an execution of the process on the second platform while the process continues to execute on the first platform;

monitoring the execution of the process on the second platform to ensure predetermined standards for the execution of the process; and changing a destination of real time data for the process from the first platform to the second platform.

18. The system of claim 17, wherein selecting the process to be migrated from the first platform to the second platform comprises selecting the process that is part of an application executing on the first platform, the operations comprising:

testing the execution of the process on the second platform prior to changing the destination of the real time data for the process from the first platform to the second platform;

determining that the execution of the process on the second platform passes the testing and, in response, changing the destination of real time data for the process from the first platform to the second platform; and selecting another process from the plurality of processes that is part of the application executing on the first platform to be migrated from the first platform to the second platform.

19. The system of claim 17, wherein:

the multi-platform system comprises a plurality of logical partitions including a first logical partition and a second logical partition; and the first platform comprises a first operating system executing in the first logical partition, and the second platform comprises a different, second operating system executing in the second logical partition of the plurality of logical partitions.

20. The system of claim 17, wherein selecting the process to be migrated from the first platform to the second platform comprises:

selecting a subset of the processes based on the evaluation of the candidacy of the plurality of processes;

determining a cost of migrating each of the processes of the subset;

determining a migration priority of each of the processes of the subset using the respective cost of migrating each of the processes of the subset; and selecting a highest priority process from the subset as the process to be migrated from the first platform to the second platform using the migration priority.

21. The system of claim 20, wherein selecting the subset of the processes comprises selecting a subset of the processes that are determined to be not specific to the first platform.

22. The system of claim 20, the operations comprising:

determining (i) an amount of processing required by a central processing unit of the multi-platform system to perform the process, (ii) a number of operands included in source code corresponding to the process, or (iii) a number of dependencies corresponding to the process, wherein the cost for migrating the process is based at least on (i) the amount of processing required by a central processing unit of the multi-platform system to perform the process, (ii) the number of operands included in source code corresponding to the process, or (iii) the number of dependencies corresponding to the process.

23. The system of claim 22, wherein determining a number of dependencies corresponding to the process comprises estimating a number of operations performed with one or more other processes by the process.

24. The system of claim 22, wherein determining a migration priority of each of the processes of the subset comprises assigning (i) a first priority to the process if the cost of migrating the process does not satisfy a threshold, or (ii) a second, lower priority to the process if the cost of migrating the process does satisfy a threshold.

25. The system of claim 17, wherein evaluating the candidacy of the plurality of processes comprises determining whether the process is specific to the first platform.

26. The system of claim 17, wherein monitoring the execution of the process on the second platform to ensure the predetermined standards for the execution of the process comprises monitoring the reliability of the execution of the process on the second platform.

27. The system of claim 17, wherein monitoring the execution of the process on the second platform to ensure the predetermined standards for the execution of the process comprises monitoring the performance of the execution of the process on the second platform.

28. The system of claim 17, wherein duplicating the execution of the process on the second platform while the process continues to execute on the first platform comprises duplicating data used by the process for use by the process executing on the second platform.

29. The system of claim 28, the operations comprising using output from both the process executing on the first platform and from the process executing on the second platform.

30. The system of claim 28, the operations comprising:

testing the execution of the process on the second platform prior to changing the destination of the real time data for the process from the first platform to the second platform; and determining that the execution of the process on the second platform passes the testing and, in response, changing the destination of real time data for the process from the first platform to the second platform.

31. The system of claim 17, wherein selecting the process to be migrated from the first platform to the second platform comprises selecting the process that is part of an application executing on the first platform.

32. The system of claim 17, the operations comprising terminating the execution of the process on the first platform.

33. A non-transitory computer-readable medium storing software comprising instructions executable by one or more computers which, upon such execution, cause the one or more computers to perform operations comprising:

evaluating a candidacy of a plurality of processes executing on a first platform of a multi-platform system for migration to a different, second platform of the multi-platform system;

selecting a process from the plurality of processes to be migrated from the first platform to the second platform;

duplicating an execution of the process on the second platform while the process continues to execute on the first platform;

monitoring the execution of the process on the second platform to ensure predetermined standards for the execution of the process; and changing a destination of real time data for the process from the first platform to the second platform.

34. The computer-readable medium of claim 33, wherein selecting the process to be migrated from the first platform to the second platform comprises selecting the process that is part of an application executing on the first platform, the operations comprising:

testing the execution of the process on the second platform prior to changing the destination of the real time data for the process from the first platform to the second platform;

determining that the execution of the process on the second platform passes the testing and, in response, changing the destination of real time data for the process from the first platform to the second platform; and selecting another process from the plurality of processes that is part of the application executing on the first platform to be migrated from the first platform to the second platform.

35. The computer-readable medium of claim 33, wherein:

the multi-platform system comprises a plurality of logical partitions including a first logical partition and a second logical partition; and the first platform comprises a first operating system executing in the first logical partition, and the second platform comprises a different, second operating system executing in the second logical partition of the plurality of logical partitions.

36. The computer-readable medium of claim 33, wherein selecting the process to be migrated from the first platform to the second platform comprises:

selecting a subset of the processes based on the evaluation of the candidacy of the plurality of processes;

determining a cost of migrating each of the processes of the subset;

determining a migration priority of each of the processes of the subset using the respective cost of migrating each of the processes of the subset; and selecting a highest priority process from the subset as the process to be migrated from the first platform to the second platform using the migration priority.

37. The computer-readable medium of claim 36, wherein selecting the subset of the processes comprises selecting a subset of the processes that are determined to be not specific to the first platform.

38. The computer-readable medium of claim 36, the operations comprising:

determining (i) an amount of processing required by a central processing unit of the multi-platform system to perform the process, (ii) a number of operands included in source code corresponding to the process, or (iii) a number of dependencies corresponding to the process, wherein the cost for migrating the process is based at least on (i) the amount of processing required by a central processing unit of the multi-platform system to perform the process, (ii) the number of operands included in source code corresponding to the process, or (iii) the number of dependencies corresponding to the process.

39. The computer-readable medium of claim 38, wherein determining a number of dependencies corresponding to the process comprises estimating a number of operations performed with one or more other processes by the process.

40. The computer-readable medium of claim 38, wherein determining a migration priority of each of the processes of the subset comprises assigning (i) a first priority to the process if the cost of migrating the process does not satisfy a threshold, or (ii) a second, lower priority to the process if the cost of migrating the process does satisfy a threshold.

41. The computer-readable medium of claim 33, wherein evaluating the candidacy of the plurality of processes comprises determining whether the process is specific to the first platform.

42. The computer-readable medium of claim 33, wherein monitoring the execution of the process on the second platform to ensure the predetermined standards for the execution of the process comprises monitoring the reliability of the execution of the process on the second platform.

43. The computer-readable medium of claim 33, wherein monitoring the execution of the process on the second platform to ensure the predetermined standards for the execution of the process comprises monitoring the performance of the execution of the process on the second platform.

44. The computer-readable medium of claim 33, wherein duplicating the execution of the process on the second platform while the process continues to execute on the first platform comprises duplicating data used by the process for use by the process executing on the second platform.

45. The computer-readable medium of claim 44, the operations comprising using output from both the process executing on the first platform and from the process executing on the second platform.

46. The computer-readable medium of claim 44, the operations comprising:

testing the execution of the process on the second platform prior to changing the destination of the real time data for the process from the first platform to the second platform; and determining that the execution of the process on the second platform passes the testing and, in response, changing the destination of real time data for the process from the first platform to the second platform.

47. The computer-readable medium of claim 33, wherein selecting the process to be migrated from the first platform to the second platform comprises selecting the process that is part of an application executing on the first platform.

48. The computer-readable medium of claim 33, the operations comprising terminating the execution of the process on the first platform.

* * * * *